US012576758B2

(12) United States Patent
Lee et al.

(10) Patent No.: US 12,576,758 B2
(45) Date of Patent: Mar. 17, 2026

(54) SHOULDER AIRBAG AND METHOD OF CONTROLLING DEPLOYMENT THEREOF

(71) Applicant: HYUNDAI MOBIS CO., LTD., Seoul (KR)

(72) Inventors: Dong Gil Lee, Yongin-si (KR); Jiwoon Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 243 days.

(21) Appl. No.: 18/460,384

(22) Filed: Sep. 1, 2023

(65) Prior Publication Data

US 2024/0092238 A1     Mar. 21, 2024

(30) Foreign Application Priority Data

Sep. 21, 2022     (KR) ......................... 10-2022-0119457

(51) Int. Cl.
*B60N 2/427*          (2006.01)
*B60N 2/00*          (2006.01)
(Continued)

(52) U.S. Cl.
CPC ......... *B60N 2/4279* (2013.01); *B60N 2/0027* (2023.08); *B60N 2/0268* (2023.08);
(Continued)

(58) Field of Classification Search
CPC .............. B60R 21/231; B60R 21/2338; B60R 2021/23384; B60R 2021/01013; B60R 2021/01322; B60R 2021/161; B60R 2021/23308; B60R 21/015; B60R 21/013; B60R 21/01512; B60R 21/16

(Continued)

(56) References Cited

U.S. PATENT DOCUMENTS 9,539,969 B2 * 1/2017 Crandall ............. B60R 21/0134
10,457,234 B2 * 10/2019 Ohno ...................... B60R 21/01
(Continued)

FOREIGN PATENT DOCUMENTS

KR     20210065627 A * 6/2021 ........... B60R 21/207
WO     WO-2021002076 A1 * 1/2021 ........... B60R 21/231

*Primary Examiner* — Paul N Dickson
*Assistant Examiner* — Caitlin Anne Miller
(74) *Attorney, Agent, or Firm* — Novo TechIP International PLLC

(57)          ABSTRACT

Disclosed are a shoulder airbag and a method of controlling deployment thereof that are capable of adjusting the amount of inflation of chambers covering an occupant's shoulders depending on the body type of the occupant and/or the collision direction of a vehicle, thereby safely protecting the occupant in various collision situations. The shoulder airbag includes an occupant detection sensor configured to detect the posture and body type of an occupant, an airbag cushion including chambers configured to be inflated and deployed so as to cover the front, side, and upper portions of each of the shoulders of the occupant, and a controller configured to variably control the amount of inflation of each of the chambers covering the front, side, and upper portions of each of the shoulders of the occupant based on occupant information analyzed based on the posture and body type of the occupant when a collision accident occurs.

17 Claims, 10 Drawing Sheets

(51) Int. Cl.

| | |
|---|---|
| *B60N 2/02* | (2006.01) |
| *B60N 2/90* | (2018.01) |
| *B60R 21/015* | (2006.01) |
| *B60R 21/231* | (2011.01) |
| *B60R 21/233* | (2006.01) |

(52) U.S. Cl.
CPC ......... *B60N 2/0273* (2023.08); *B60N 2/0276* (2013.01); *B60N 2/914* (2018.02); *B60R 21/01538* (2014.10); *B60R 21/23138* (2013.01); *B60R 21/233* (2013.01); *B60N 2210/24* (2023.08); *B60R 2021/23146* (2013.01)

(58) Field of Classification Search
USPC ............................................ 280/736; 701/45
See application file for complete search history.

(56) References Cited

U.S. PATENT DOCUMENTS

| | | | | |
|---|---|---|---|---|
| 11,110,883 | B1 * | 9/2021 | Deng | .................... B60R 21/264 |
| 11,345,305 | B2 | 5/2022 | Fischer et al. | |
| 11,628,789 | B2 * | 4/2023 | Manawadu | ....... B60R 21/01552 |
| | | | | 701/45 |
| 11,780,586 | B2 * | 10/2023 | Provenza | .......... B60R 21/01512 |
| | | | | 244/121 |
| 11,787,361 | B1 * | 10/2023 | Patel | .................... B60R 21/233 |
| | | | | 280/730.2 |
| 11,851,020 | B1 * | 12/2023 | Deng | ................ B60R 21/23138 |
| 2018/0201222 | A1 * | 7/2018 | Gandhi | ............. B60R 21/01542 |
| 2019/0003877 | A1 * | 1/2019 | Aina | ...................... G01G 19/12 |
| 2021/0170983 | A1 * | 6/2021 | Shin | ...................... B60R 21/207 |
| 2024/0149818 | A1 * | 5/2024 | Yoshikawa | ......... B60R 21/0136 |
| 2024/0391406 | A1 * | 11/2024 | Im | .......................... B60R 21/013 |
| 2024/0391407 | A1 * | 11/2024 | Cho | .................. B60R 21/01552 |

* cited by examiner

*300*
(THICKNESS
ADJUSTMENT)

*120*

*300*
(THICKNESS
ADJUSTMENT)

SHOULDER AIRBAG AND METHOD OF CONTROLLING DEPLOYMENT THEREOF

CROSS-REFERENCE TO RELATED APPLICATIONS

This application claims the priority benefit of Korean Patent Application No. 10-2022-0119457, filed on Sep. 21, 2022, in the Korean Intellectual Property Office, the disclosure of which is incorporated herein by reference.

TECHNICAL FIELD

The present disclosure relates to a shoulder airbag and a method of controlling deployment thereof that are capable of adjusting the amount of inflation of chambers covering an occupant's shoulders depending on the body type of the occupant and/or the collision direction of a vehicle, thereby safely protecting the occupant in various collision situations.

BACKGROUND

Airbags protect occupants from impact in the event of a vehicle accident by properly inflating airbag cushions, thus reducing or preventing the risk of injury. The inflating behavior of airbag cushions plays a very important role in securing the safety of occupants.

In the case of shoulder airbags for protection of shoulders of occupants, cushions are regularly shaped. Thus, it is difficult to protect occupants having various body types.

Therefore, in order to improve occupant restraining and cushioning performance of such a shoulder airbag, technology for variably controlling the length and thickness of a cushion when inflating the cushion is required.

The information disclosed in this Background of the disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a shoulder airbag and a method of controlling deployment thereof that are capable of adjusting the amount of inflation of chambers covering an occupant's shoulders depending on the body type of the occupant and/or the collision direction of a vehicle, thereby safely protecting the occupant in various collision situations.

In accordance with an aspect of the present disclosure, the above and other objects can be accomplished by the provision of a shoulder airbag including an occupant detection sensor configured to detect the posture and body type of an occupant sitting in a seat, an airbag cushion including chambers configured to be inflated and deployed so as to cover the front portion, side portion, and upper portion of each of the shoulders of the occupant, and a controller configured to variably control the amount of inflation of each of the chambers covering the front portion, side portion, and upper portion of each of the shoulders of the occupant based on occupant information analyzed based on the posture and body type of the occupant when a collision accident occurs.

The shoulder airbag may further include a tether provided in each of the chambers so as to extend in at least one direction to regulate the deployment shape of each of the chambers and a tether release device configured to selectively release the tether in response to a signal received from the controller so that each of the chambers is selectively inflated while being expanded in a release direction of the tether.

When the tether extending in a longitudinal direction of each of the chambers is released, the amount of inflation of each of the chambers in the longitudinal direction may be increased. When the tether extending in a width direction of each of the chambers is released, the amount of inflation of each of the chambers in the width direction may be increased. When the tether extending in a thickness direction of each of the chambers is released, the amount of inflation of each of the chambers in the thickness direction may be increased.

The chambers may include a front chamber and an upper chamber, and when the occupant has a body type smaller than an average body type, the front chamber and the upper chamber may be inflated such that the lengths thereof in a leftward-rightward direction are increased.

The chambers may include a side chamber and an upper chamber, and when the occupant has a body type larger than the average body type, the side chamber and the upper chamber may be inflated such that the lengths thereof in a forward-backward direction are increased.

The shoulder airbag may further include a collision detection sensor configured to detect a collision direction when vehicle collision occurs. The controller may variably control the amount of inflation of each of the chambers covering the front portion, side portion, and upper portion of each of the shoulders of the occupant based on the collision direction.

The chambers may include a front chamber, and when front collision occurs, the front chamber may be inflated such that the thickness thereof in a forward-backward direction is increased.

The chambers may include a side chamber, and when lateral collision occurs, the side chamber may be inflated such that the thickness thereof in a leftward-rightward direction is increased.

The chambers may include an upper chamber, and when rear collision occurs in a recline mode in which a seatback is reclined, the upper chamber may be inflated such that the thickness thereof in an upward-downward direction is increased.

In accordance with another aspect of the present disclosure, there is provided a shoulder airbag including a collision detection sensor configured to detect a collision direction of a vehicle, an airbag cushion including chambers configured to be inflated and deployed so as to cover the front portion, side portion, and upper portion of each of the shoulders of an occupant, and a controller configured to variably control the amount of inflation of each of the chambers covering the front portion, side portion, and upper portion of each of the shoulders of the occupant based on the collision direction of the vehicle when a collision accident occurs.

In accordance with a further aspect of the present disclosure, there is provided a method of controlling deployment of a shoulder airbag, the method including detecting, by an occupant detection sensor, the posture and body type of an occupant sitting in a seat and variably controlling, by a controller, the amount of inflation of each of chambers of an airbag cushion deployed to cover the front portion, side portion, and upper portion of each of the shoulders of the occupant based on occupant information analyzed based on the posture and body type of the occupant when a vehicle collision accident occurs.

The shoulder airbag may include a tether provided in each of the chambers so as to extend in at least one direction to regulate the deployment shape of each of the chambers and a tether release device configured to selectively release the tether in response to a signal received from the controller so that each of the chambers is selectively inflated while being expanded in a release direction of the tether.

BRIEF DESCRIPTION OF THE DRAWINGS

The above and other objects, features, and other advantages of the present disclosure will be more clearly understood from the following detailed description taken in conjunction with the accompanying drawings, in which:

FIG. 3 is a view showing a structure in which a tether is provided in each of the chambers of the present disclosure so as to extend in a thickness direction;

DETAILED DESCRIPTION

Figure 1:
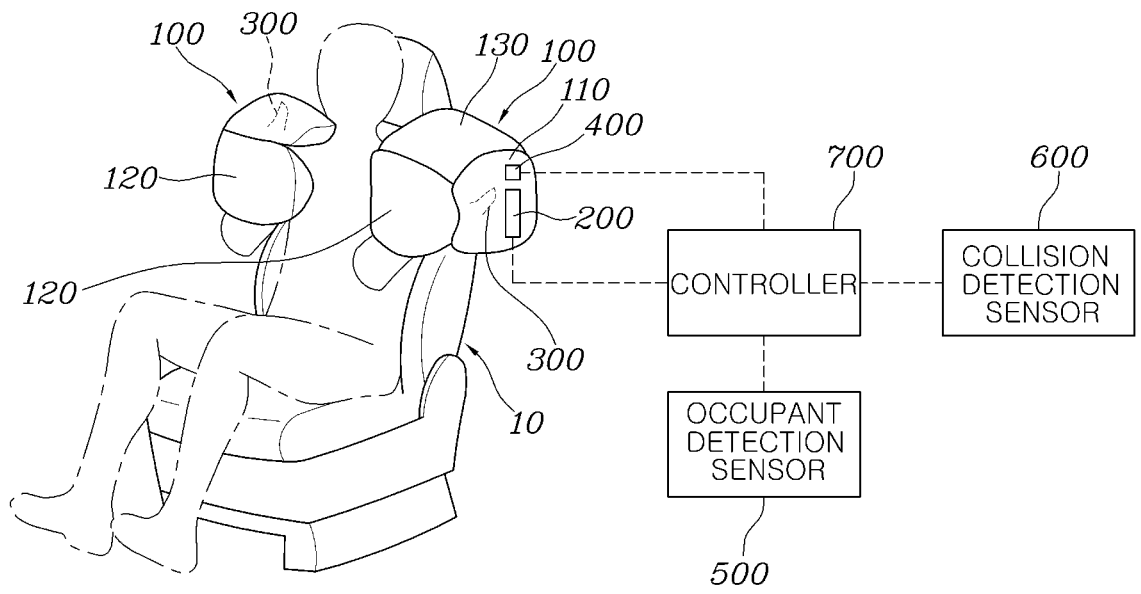
FIG. 1 is a view showing a state in which a shoulder airbag of the present disclosure is inflated and deployed around each of the shoulders of an occupant.

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and spirit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

FIG. 1 is a view showing a state in which a shoulder airbag of the present disclosure is inflated and deployed around each of the shoulders of an occupant.

Referring to the drawing, the shoulder airbag of the present disclosure includes an occupant detection sensor 500 configured to detect the posture and body type of an occupant sitting in a seat, an airbag cushion 100 including chambers configured to be inflated and deployed so as to cover the front portion, side portion, and upper portion of each of the shoulders of the occupant, and a controller 700 configured to variably control the amount of inflation of each of the chambers covering the front portion, side portion, and upper portion of each of the shoulders of the occupant based on occupant information analyzed based on the posture and body type of the occupant when a collision accident occurs.

For example, the occupant detection sensor 500 may be implemented as a photographing device such as a camera, which is capable of recognizing the posture and body type of an occupant sitting on a seat. At least one occupant detection sensor 500 may be mounted in the passenger compartment of the vehicle.

The shoulder airbag is mounted on the upper end of at least one of two side portions of a seatback 10.

The airbag cushion 100 of the shoulder airbag includes a front chamber 130, a side chamber 110, and an upper chamber 120. The front chamber 130, the side chamber 110, and the upper chamber 120 are connected to each other.

In detail, the side chamber 110 is formed in a rectangular shape to cover the side portion of each of the shoulders of the occupant.

The front chamber 130 extends from the front end of the side chamber 110 in the lateral direction toward the occupant and is formed in a rectangular shape to cover the front portion of each of the shoulders of the occupant.

The upper chamber 120 extends from the upper end of the side chamber 110 in the lateral direction toward the occupant and is formed in a rectangular shape to cover the upper portion of each of the shoulders of the occupant. The front end of the upper chamber 120 is connected to the upper end of the front chamber 130.

Accordingly, the front chamber 130, the side chamber 110, and the upper chamber 120 are deployed so as to cover the front portion, side portion, and upper portion of each of the shoulders of the occupant, respectively, thereby covering the entire area of each of the shoulders of the occupant.

An inflator 200 is connected to the side chamber 110 so that gas generated by explosion of the inflator 200 is first supplied to the side chamber 110. Hole-shaped communication portions are formed in boundaries between the chambers.

After gas is first supplied to the side chamber 110, the gas in the side chamber 110 is supplied to the front chamber 130 and the upper chamber 120 through the communication portions, with the result that the entirety of the airbag cushion 100 is inflated and deployed.

The controller 700 analyzes an image of the occupant captured by the occupant detection sensor 500 to determine the body type and posture of the occupant. For example, the occupant detection sensor 500 detects the shoulder width, sitting height, and body thickness of the occupant, and transmits the detected information to the controller 700. For example, the controller 700 may be an airbag control unit (ACU) configured to control operation of the airbag.

In the event of vehicle collision, the front chamber 130, the side chamber 110, and the upper chamber 120 are adjusted in length, width, and thickness when inflated based on the occupant information determined by the controller 700.

In this way, the airbag cushion 100 is deployed in a shape suitable for the posture and body type of the occupant, thereby more safely protecting the occupant.

Figure 2:
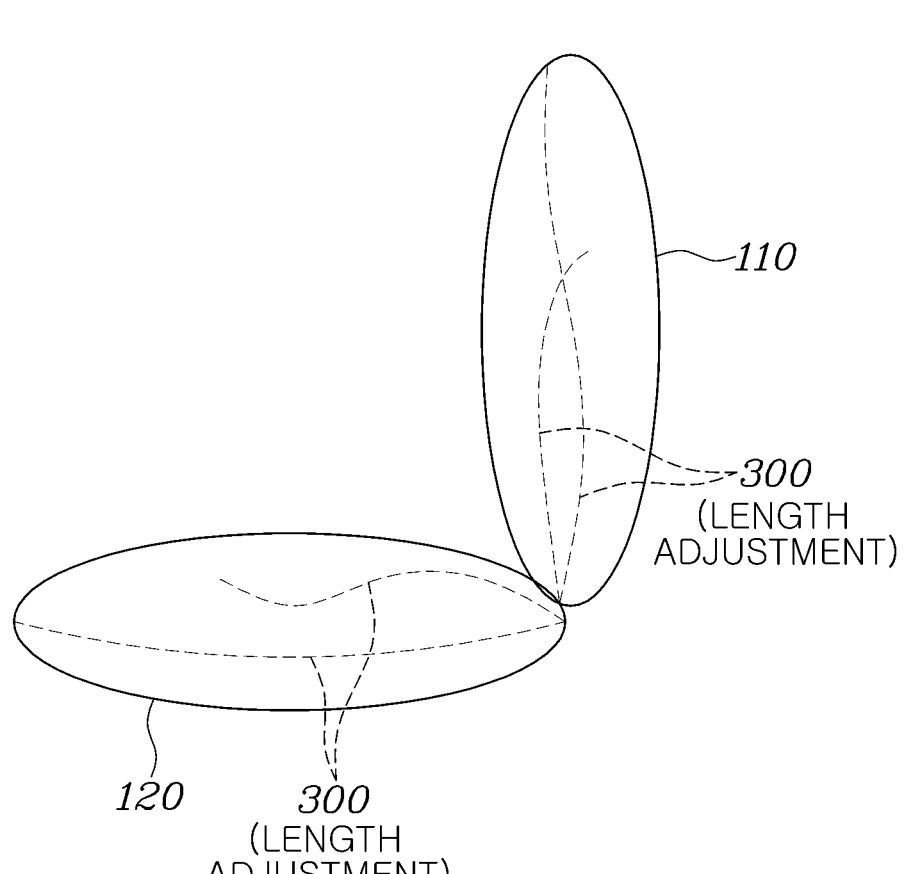
FIG. 2 is a view showing a structure in which a tether is provided in each of chambers of the present disclosure so as to extend in a longitudinal direction.
Figure 3:
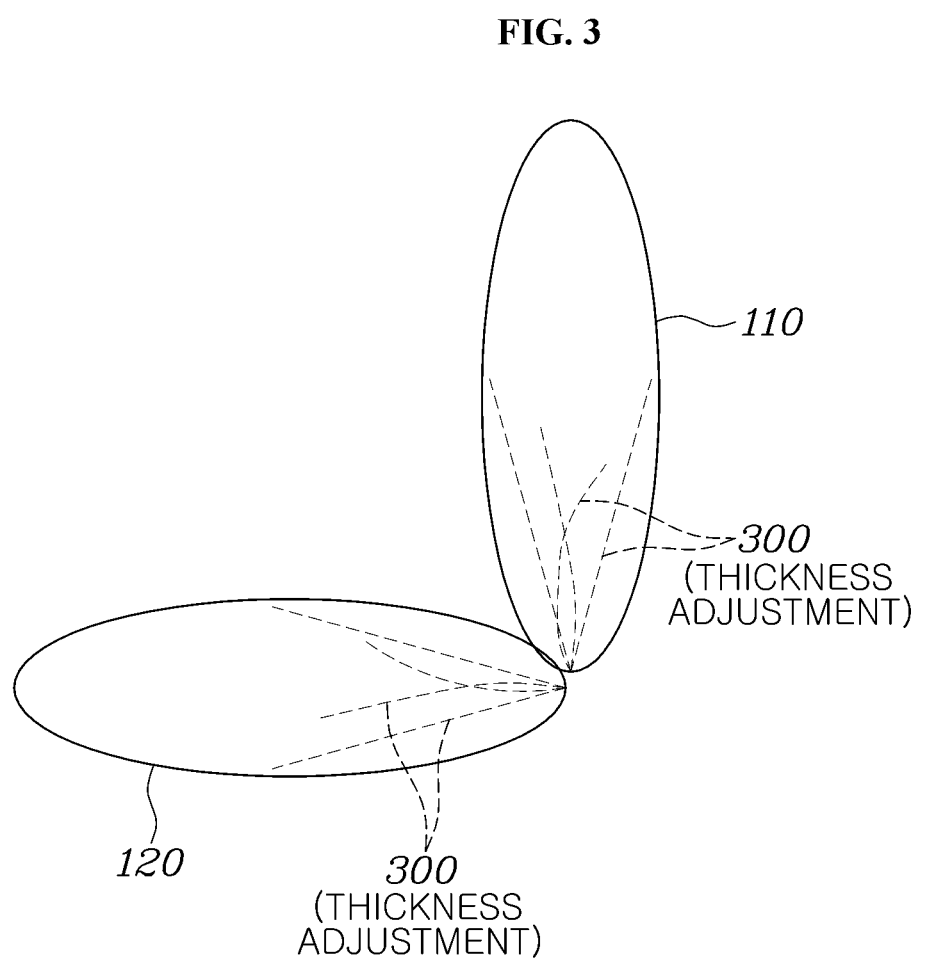

FIG. 2 is a view showing a structure in which a tether 300 is provided in each of the chambers of the present disclosure so as to extend in a longitudinal direction, and FIG. 3 is a view showing a structure in which a tether 300 is provided in each of the chambers of the present disclosure so as to extend in a thickness direction.

Referring to the drawings, the shoulder airbag according to the present disclosure includes a tether 300 provided in each of the chambers so as to extend in at least one direction to regulate the deployment shape of the chamber and a tether release device 400 configured to selectively release the tether 300 in response to a signal received from the controller 700 so that the chamber is inflated while being expanded in the release direction of the tether 300.

For example, the tether 300 is provided in each of the front chamber 130, the side chamber 110, and the upper chamber 120.

The tether 300 may extend in at least one of the longitudinal direction, the width direction, and the thickness direction in a chamber.

One end of the tether 300 is connected to the tether release device 400, and the other end thereof is fixed to the inner surface of each of the chambers.

The controller 700 determines the release direction of the tether 300 in each of the chambers based on the occupant information.

In the event of vehicle collision, the controller 700 transmits an operation signal indicative of the release direction determined thereby to the tether release device 400, and the tether release device 400 cuts or releases the tether 300 in response to the operation signal, thereby disconnecting the tether 300 therefrom.

In detail, when the tether 300 extending in the longitudinal direction of the chamber is released, the amount of inflation of the chamber in the longitudinal direction may be increased. When the tether 300 extending in the width direction of the chamber is released, the amount of inflation of the chamber in the width direction may be increased. When the tether 300 extending in the thickness direction of the chamber is released, the amount of inflation of the chamber in the thickness direction may be increased.

For example, in the case in which the tether 300 provided in the side chamber 110 extends in all of the forward-backward longitudinal direction, the upward-downward width direction, and the leftward-rightward thickness direction, when the tether 300 extending in the forward-backward longitudinal direction is released, the side chamber 110 is deployed such that the length thereof in the forward-backward direction is increased.

When the tether 300 extending in the upward-downward width direction is released, the side chamber 110 is deployed such that the width thereof in the upward-downward direction is increased. When the tether 300 extending in the leftward-rightward thickness direction is released, the side chamber 110 is deployed such that the thickness thereof in the leftward-rightward direction is increased.

Figure 4:
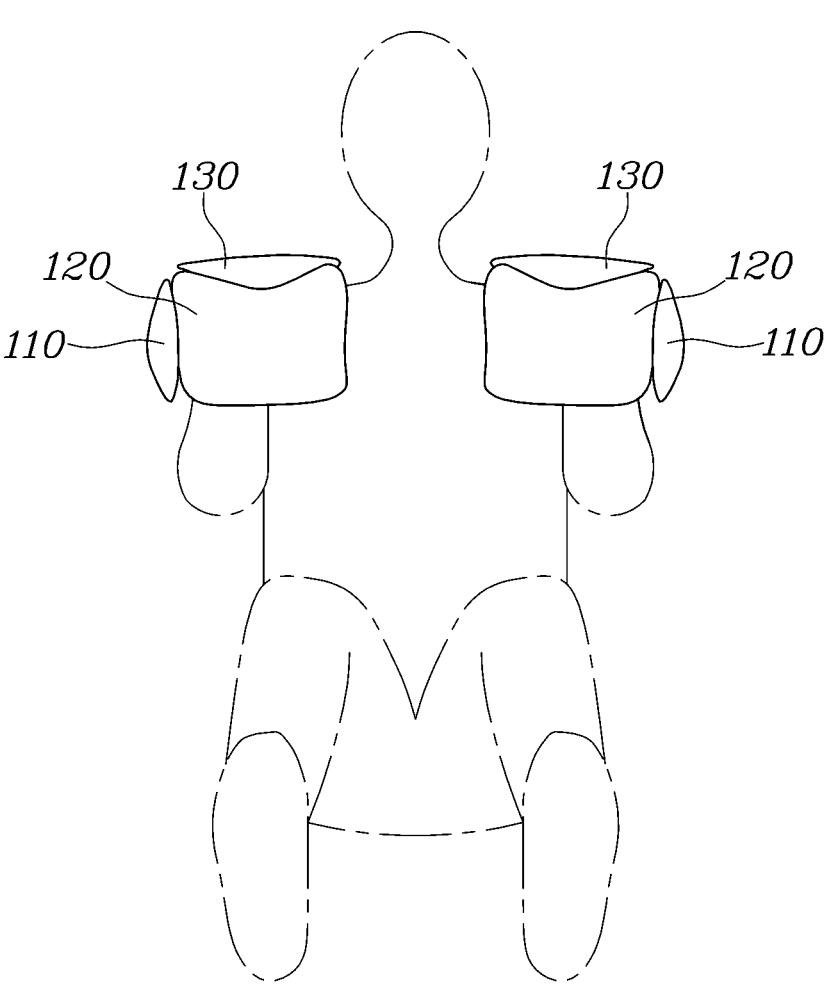
FIG. 4 is a view illustrating a state in which the shoulder airbag according to the present disclosure is deployed for an occupant having an average body type.
Figure 5:
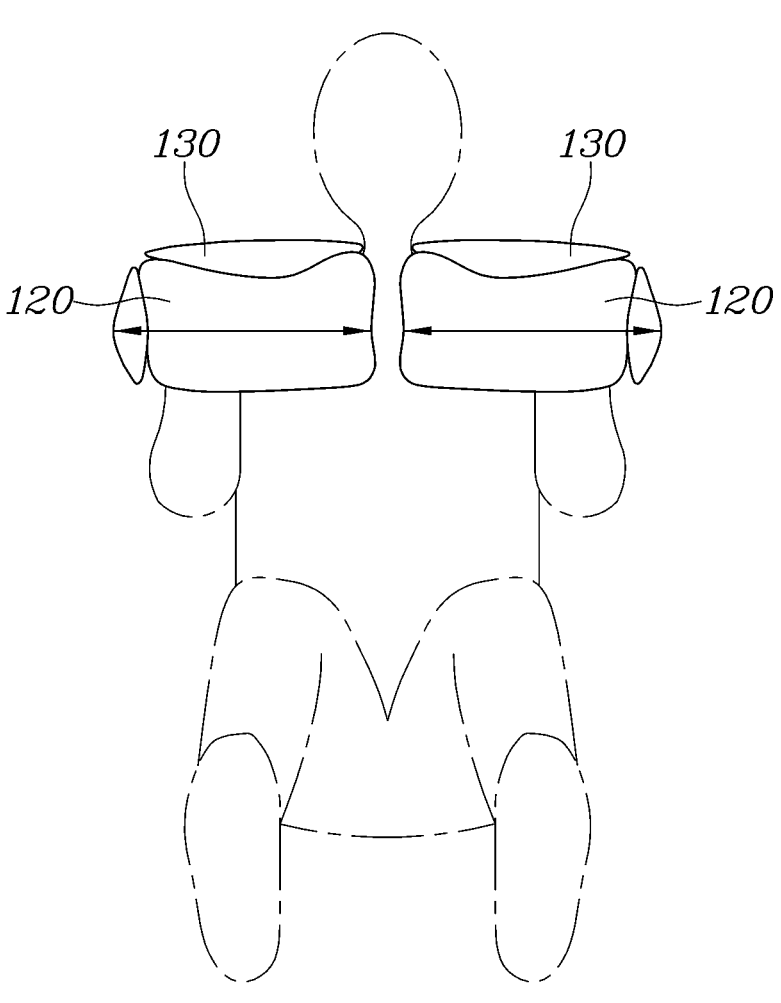
FIG. 5 is a view illustrating a state in which the shoulder airbag according to the present disclosure is deployed for an occupant having a small body type.

FIG. 4 is a view illustrating a state in which the shoulder airbag according to the present disclosure is deployed for an occupant having an average body type, and FIG. 5 is a view illustrating a state in which the shoulder airbag according to the present disclosure is deployed for an occupant having a small body type.

Referring to the drawings, when the occupant has a body type smaller than an average body type, the front chamber 130 and the upper chamber 120 may be inflated such that the lengths thereof in the leftward-rightward direction are increased.

For reference, the average body type may be set in advance taking into consideration factors such as a shoulder width, a sitting height, and a body thickness of an occupant.

In detail, when the occupant has an average body type, the front chamber 130 and the upper chamber 120 may completely cover the entire area of the shoulder of the occupant, thereby stably restraining the occupant.

However, when the occupant has a small or thin body type, the area of the shoulder that overlaps the front chamber 130 and the upper chamber 120 is not large. Thus, the occupant may not be completely restrained by the front chamber 130 and the upper chamber 120, and may escape or slip out of the airbag cushion 100.

Therefore, when an occupant having a small body type is in the vehicle, the tethers 300 extending in the leftward-rightward direction in the front chamber 130 and the upper chamber 120 are released, with the result that the front chamber 130 and the upper chamber 120 are deployed such that the lengths thereof in the leftward-rightward direction are increased.

Accordingly, the area of the shoulder that overlaps the front chamber 130 and the upper chamber 120 is increased, whereby the occupant is tightly restrained.

Figure 6:
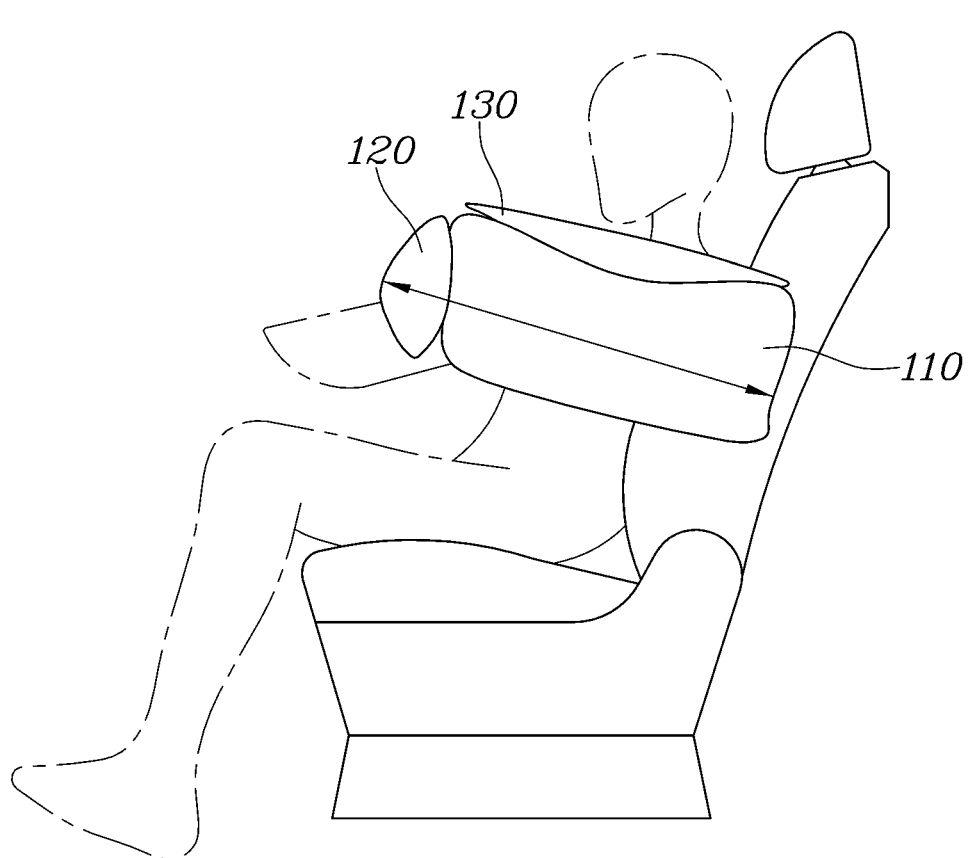
FIG. 6 is a view illustrating a state in which the shoulder airbag according to the present disclosure is deployed for an occupant having a large body type.

FIG. 6 is a view illustrating a state in which the shoulder airbag according to the present disclosure is deployed for an occupant having a large body type.

Referring to the drawing, when the occupant has a body type larger than an average body type, the side chamber 110 and the upper chamber 120 may be inflated such that the lengths thereof in the forward-backward direction are increased.

In detail, in the case of an occupant having a large body type, such as a thick body or broad shoulders, it may be difficult for the airbag to be normally deployed because the front chamber 130 and the upper chamber 120 are not seated on the shoulder at the beginning of deployment of the airbag cushion 100.

Therefore, when an occupant having a large body type is in the vehicle, the tethers 300 extending in the forward-backward direction in the side chamber 110 and the upper chamber 120 are released, with the result that the side chamber 110 and the upper chamber 120 are deployed such that the lengths thereof in the forward-backward direction are increased.

Accordingly, the front chamber 130 and the upper chamber 120 are stably seated on the shoulder, whereby the occupant is tightly restrained.

Referring back to FIG. 1, the shoulder airbag of the present disclosure further includes a collision detection sensor 600 configured to detect a collision direction in the event of vehicle collision. The controller 700 may variably control the amount of inflation of each of the chambers covering the front portion, side portion, and upper portion of each of the shoulders of the occupant based on the collision direction.

For example, the collision detection sensor 600 may be implemented as a sensor capable of recognizing a collision direction or an expected collision direction of the vehicle. At least one collision detection sensor 600 may be mounted inside/outside the passenger compartment.

In the event of vehicle collision, the front chamber 130, the side chamber 110, and the upper chamber 120 are adjusted in length, width, and thickness when inflated based on the collision direction determined by the controller 700.

In this way, the airbag cushion 100 is deployed in a shape suitable for the collision direction of the vehicle, thereby more safely protecting the occupant.

Figure 7:
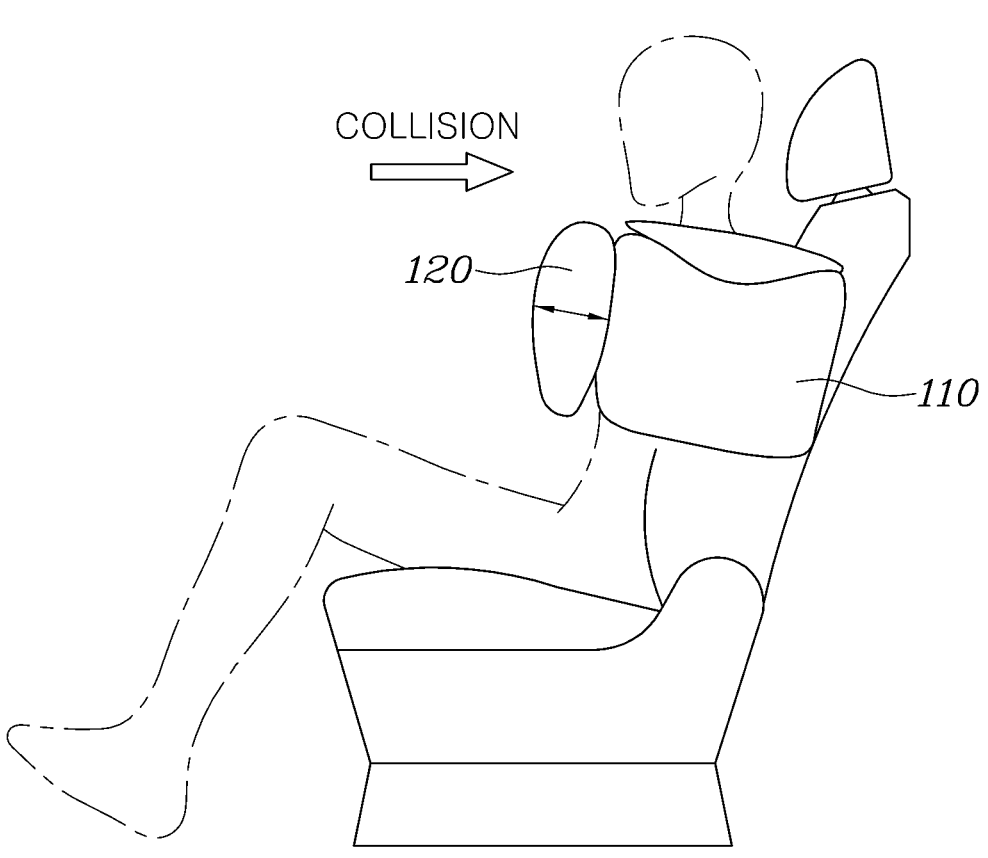
FIG. 7 is a view illustrating a state in which the shoulder airbag according to the present disclosure is deployed in the event of front collision.

FIG. 7 is a view illustrating a state in which the shoulder airbag according to the present disclosure is deployed in the event of front collision.

Referring to the drawing, when front collision occurs, the front chamber 130 may be inflated such that the thickness thereof in the forward-backward direction is increased.

In detail, when front collision occurs in the state in which the occupant sits while facing forward, the tether 300 extending in the forward-backward thickness direction in the front chamber 130 is released, with the result that the front chamber 130 is deployed such that the thickness thereof in the forward-backward direction is increased.

Accordingly, the airbag cushion 100 deployed in the collision direction is increased in thickness, thereby effectively reducing the risk of injury.

Figure 8:
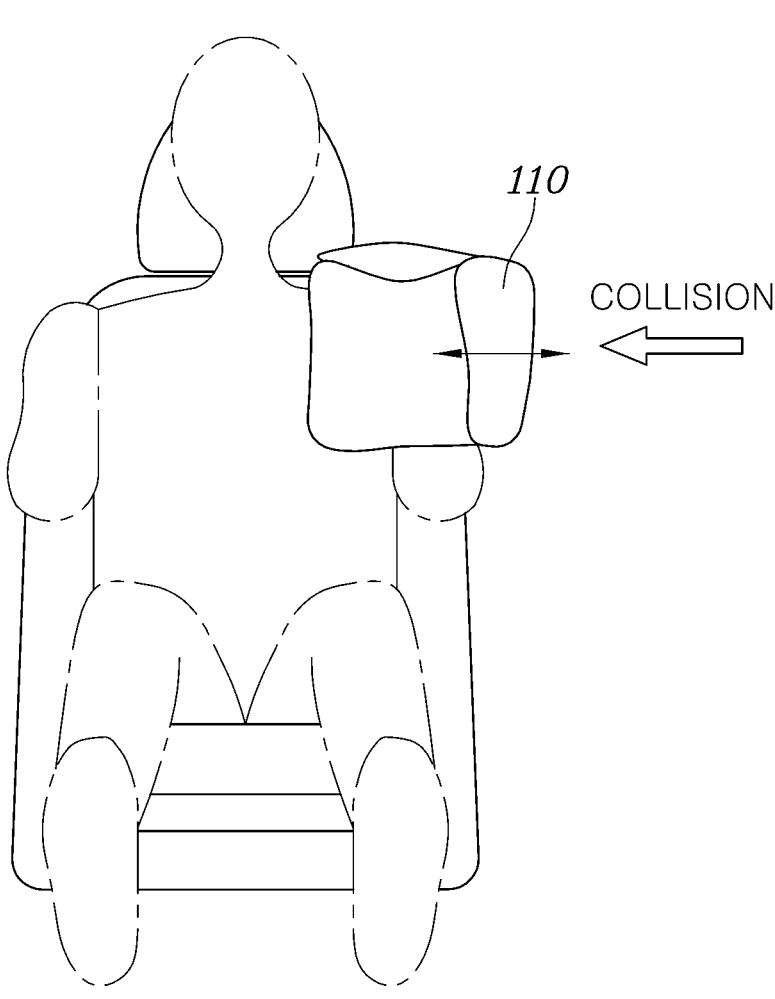
FIG. 8 is a view illustrating a state in which the shoulder airbag according to the present disclosure is deployed in the event of lateral collision.

FIG. 8 is a view illustrating a state in which the shoulder airbag according to the present disclosure is deployed in the event of lateral collision.

Referring to the drawing, when lateral collision occurs, the side chamber 110 may be inflated such that the thickness thereof in the leftward-rightward direction is increased.

In detail, when lateral collision occurs and impact is applied to a side surface of the seat, in which the shoulder airbag is mounted, the tether 300 extending in the leftward-rightward thickness direction in the side chamber 110 is released, with the result that the side chamber 110 is deployed such that the thickness thereof in the leftward-rightward direction is increased.

Accordingly, the airbag cushion 100 deployed in the collision direction is increased in thickness, thereby effectively reducing the risk of injury.

Figure 9:
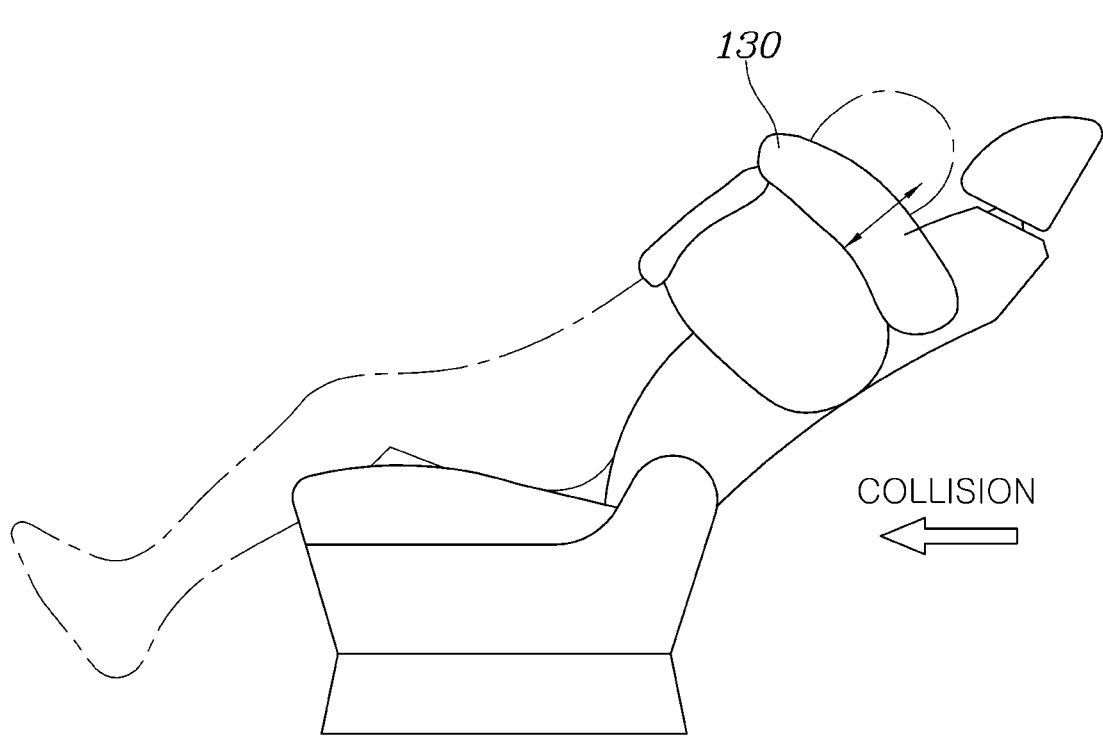
FIG. 9 is a view illustrating a state in which the shoulder airbag according to the present disclosure is deployed when rear collision occurs in a recline mode of a seat.

FIG. 9 is a view illustrating a state in which the shoulder airbag according to the present disclosure is deployed when rear collision occurs in a recline mode of the seat.

Referring to the drawing, when rear collision occurs in a recline mode in which the seatback 10 is reclined, the upper chamber 120 may be inflated such that the thickness thereof in the upward-downward direction is increased.

In detail, when rear collision occurs in the state in which the occupant sits in the recline mode, the tether 300 extending in the upward-downward thickness direction in the upper chamber 120 is released, with the result that the upper chamber 120 is deployed such that the thickness thereof in the upward-downward direction is increased.

Accordingly, the airbag cushion 100 deployed in the collision direction is increased in thickness, thereby effectively reducing the risk of injury. In particular, the upper chamber 120 prevents a phenomenon that the occupant is moved upward along the seatback 10, i.e. ramping-up behavior of the occupant, and the front chamber 130 prevents the occupant from being pushed in a direction away from a collision side of the vehicle.

Alternatively, the shoulder airbag according to the present disclosure may include a collision detection sensor 600 configured to detect a collision direction of the vehicle, an airbag cushion 100 including chambers configured to be inflated and deployed so as to cover the front portion, side portion, and upper portion of each of the shoulders of the occupant, and a controller 700 configured to variably control the amount of inflation of each of the chambers covering the front portion, side portion, and upper portion of each of the shoulders of the occupant based on the collision direction of the vehicle when a collision accident occurs.

A method of controlling deployment of the shoulder airbag according to the present disclosure includes an occupant detection step of detecting, by the occupant detection sensor 500, the posture and body type of the occupant sitting in the seat and an inflation control step of variably controlling, by the controller 700, the amount of inflation of each of the chambers of the airbag cushion 100 deployed to cover the front portion, side portion, and upper portion of each of the shoulders of the occupant based on occupant information analyzed based on the posture and body type of the occupant when a vehicle collision accident occurs.

In addition, the method of controlling deployment of the shoulder airbag according to the present disclosure may further include a collision detection step of detecting, by the collision detection sensor 600, the collision direction of the vehicle in the event of vehicle collision. In the inflation control step, the amount of inflation of each of the chambers covering the front portion, side portion, and upper portion of each of the shoulders of the occupant may be variably controlled based on the collision direction.

Figure 10:
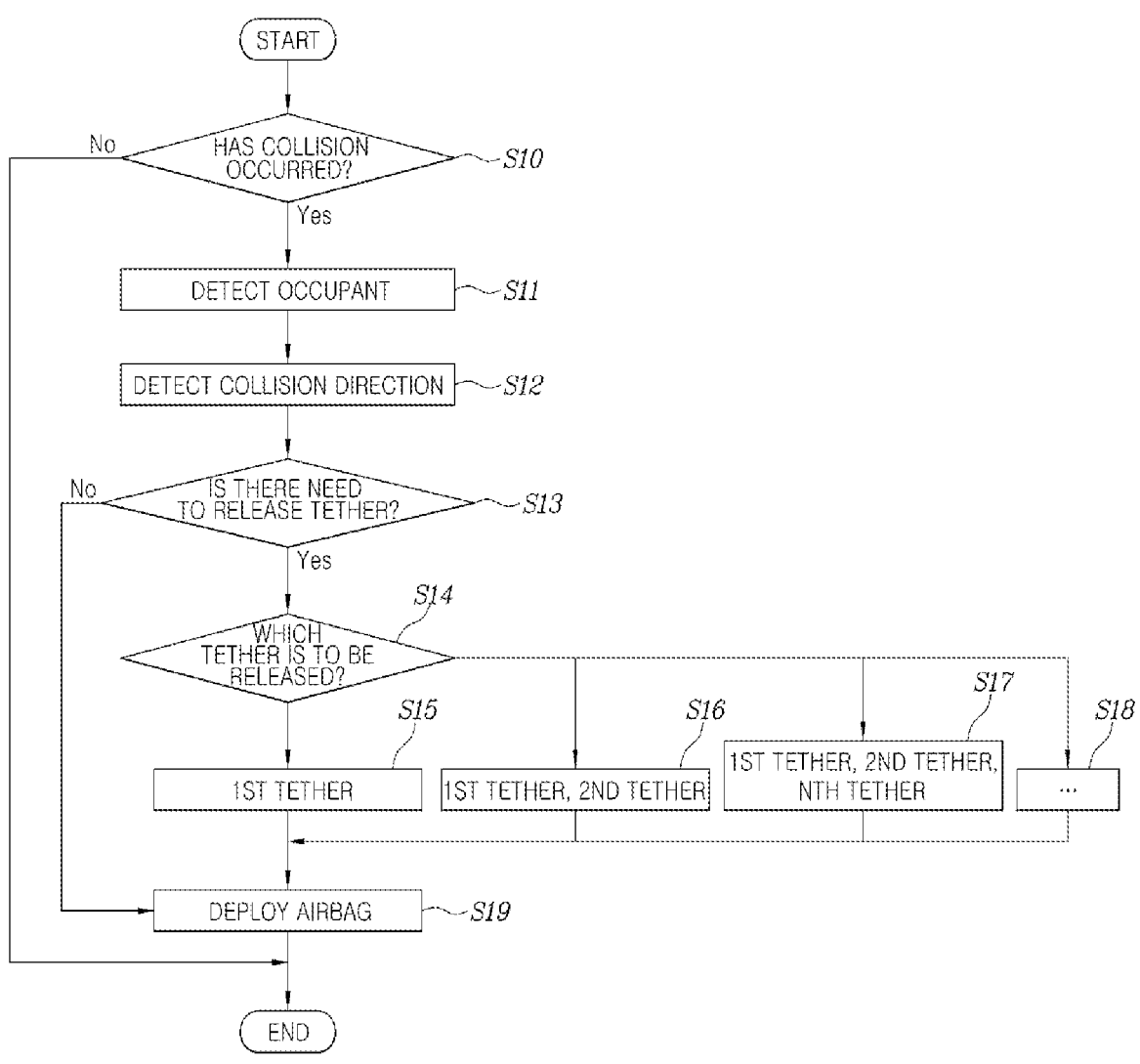
FIG. 10 is a diagram illustrating a process of controlling deployment of the shoulder airbag according to the present disclosure.

FIG. 10 is a diagram illustrating a process of controlling deployment of the shoulder airbag according to the present disclosure.

The process of deploying the shoulder airbag will now be described with reference to the drawing. Whether a collision occurs is monitored during travel of a vehicle in which an occupant is riding (S10).

When it is determined that vehicle collision has occurred based on a result of the monitoring, the sitting posture and body type of the occupant are analyzed based on a detection signal from the occupant detection sensor 500, and the collision direction of the vehicle is determined based on a detection signal from the collision detection sensor 600 (S11 and S12).

Subsequently, a determination as to whether there is a need to release the tether 300 is made based on results of the detection and the determination performed in steps S11 and S12 (S13).

That is, a determination as to whether there is a chamber to be increased in length or thickness through release of the tether 300 when deployed is made.

When it is determined that there is a need to release the tether 300 based on a result of the determination performed in step S13, the corresponding tether 300 to be released is determined (S14).

Subsequently, the corresponding tether 300 determined to be needed to be released in step S14 is released by the tether release device 400 in steps S15 to S18.

For example, assuming that the tether 300 extending in the forward-backward longitudinal direction in the side chamber 110 is a first tether and the tether 300 extending in the forward-backward longitudinal direction in the upper chamber 120 is a second tether, when an occupant having a large body type is in the vehicle, as shown in FIG. 6, the first tether and the second tether are released in order to increase the lengths of the side chamber 110 and the upper chamber 120 in the forward-backward direction when deploying the side chamber 110 and the upper chamber 120.

Accordingly, the airbag cushion 100 is deployed such that the chambers completely cover the entire area of each of the shoulders of the occupant, thereby tightly restraining the occupant, thus safely protecting the occupant (S19).

As described above, according to the present disclosure, when vehicle collision occurs, the front chamber 130, the side chamber 110, and the upper chamber 120 are adjusted in length, width, and thickness when inflated based not only on the sitting posture and body type of the occupant but also on the collision direction of the vehicle.

Accordingly, the airbag cushion 100 is deployed in a shape suitable for the posture and body type of the occupant and the collision direction of the vehicle, thereby more safely protecting the occupant.

Further, the upper chamber 120 covering the upper portion of each of the shoulders of the occupant prevents a phenomenon that the occupant is moved upward along the seatback 10, i.e. the ramping-up behavior of the occupant, thereby eliminating the risk of injury due to the ramping-up behavior. Furthermore, the front chamber 130 covering the front portion of each of the shoulders of the occupant prevents the occupant from being pushed in a direction away from the seatback 10, thereby more safely protecting the occupant.

As is apparent from the above description, the present disclosure provides a shoulder airbag and a method of controlling deployment thereof that are capable of inflating a front chamber, a side chamber, and an upper chamber while adjusting the lengths, widths, and thicknesses thereof based on the sitting posture and body type of an occupant and the collision direction of a vehicle when vehicle collision occurs.

Accordingly, it is possible to safely protect the occupant by deploying an airbag cushion so as to be suitable for the posture and body type of the occupant and the collision direction of the vehicle.

Further, upward movement of the occupant along a seatback, i.e. the ramping-up behavior of the occupant, is prevented by the upper chamber covering the upper portion of each of the shoulders of the occupant, whereby the risk of injury due to the ramping-up behavior is eliminated. Furthermore, the occupant is prevented from being pushed in a direction away from the seatback by the front chamber covering the front portion of each of the shoulders of the occupant, whereby the occupant is more safely protected.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A shoulder airbag comprising:
an occupant detection sensor configured to detect a posture and a body type of an occupant sitting in a seat;
an airbag cushion including chambers configured to be inflated and deployed to cover a front portion, a side portion, and an upper portion of both shoulders of the occupant;
a controller configured to variably control an amount of inflation of each of the chambers covering the front portion, the side portion, and the upper portion of each of the shoulders of the occupant when a collision accident occurs based on occupant information, the occupant information being determined from the posture and the body type of the occupant;
a tether provided in each of the chambers that extends in at least one direction to regulate a deployment shape of each of the chambers, respectively; and
a tether release device configured to selectively release the tether in response to a signal received from the controller,
wherein each of the chambers is selectively inflated while being expanded in a release direction of the tether in response to the release of the tether for the chamber.

2. The shoulder airbag according to claim 1, wherein, when the tether extends in a longitudinal direction, the amount of inflation of the chamber associated with the tether is increased in the longitudinal direction when the tether is released,
wherein, when the tether extends in a width direction, the amount of inflation of the chamber associated with the tether is increased in the width direction when the tether is released, and
wherein, when the tether extends in a thickness direction, the amount of inflation the chamber associated with the tether is increased in the thickness direction when the tether is released.

3. The shoulder airbag according to claim 1, wherein the chambers include a front chamber and an upper chamber, and
wherein, when the occupant has a body type smaller than an average body type, the front chamber and the upper chamber are inflated such that lengths of the front chamber and the upper chamber in a leftward-rightward direction are increased.

4. The shoulder airbag according to claim 1, wherein the chambers include a side chamber and an upper chamber, and
wherein, when the occupant has a body type larger than an average body type, the side chamber and the upper chamber are inflated such that lengths of the side chamber and the upper chamber in a forward-backward direction are increased.

5. The shoulder airbag according to claim 1, further comprising a collision detection sensor configured to detect a collision direction when vehicle collision occurs, wherein the controller variably controls the amount of inflation of each of the chambers covering the front portion, the side portion, and the upper portion of each of the shoulders of the occupant based at least in part on the collision direction.

6. The shoulder airbag according to claim 5, wherein the chambers include a front chamber, and wherein, when a front collision occurs, the front chamber is inflated such that a thickness of the front chamber in a forward-backward direction is increased.

7. The shoulder airbag according to claim 5, wherein the chambers include a side chamber, and wherein, when a lateral collision occurs, the side chamber is inflated such that a thickness of the side chamber in a leftward-rightward direction is increased.

8. The shoulder airbag according to claim 5, wherein the chambers include an upper chamber, and wherein, when a rear collision occurs in a recline mode in which a seatback is reclined, the upper chamber is inflated such that a thickness of the upper chamber in an upward-downward direction is increased.

9. A shoulder airbag comprising:

a collision detection sensor configured to detect a collision direction of a vehicle;

an airbag cushion including chambers configured to be inflated and deployed to cover a front portion, a side portion, and an upper portion of each of shoulders of an occupant;

a controller configured to variably control an amount of inflation of each of the chambers covering the front portion, the side portion, and the upper portion of each of the shoulders of the occupant based on the collision direction of the vehicle when a collision accident occurs;

a tether provided in each of the chambers that extends in at least one direction to regulate a deployment shape of each of the chambers, respectively; and a tether release device configured to selectively release the tether in response to a signal received from the controller, wherein each of the chambers is selectively inflated while being expanded in a release direction of the tether in response to the release of the tether for the chamber.

10. A method of controlling deployment of a shoulder airbag, the method comprising:

detecting, by an occupant detection sensor, a posture and a body type of an occupant sitting in a seat; and variably controlling, by a controller, an amount of inflation of an airbag cushion, the airbag cushion including chambers that are deployed to cover a front portion, a side portion, and an upper portion of each of shoulders of the occupant, the amount of inflation being controlled based on occupant information determined from the posture and the body type of the occupant when a vehicle collision accident occurs, wherein the shoulder airbag comprises:

a tether provided in each of the chambers that extend in at least one direction to regulate a deployment shape of the chambers; and a tether release device configured to selectively release the tether in response to a signal received from the controller and cause each of the chambers to be selectively inflated while being expanded in a release direction of the tether.

11. The method according to claim 10, wherein, when the tether extends in a longitudinal direction, the amount of inflation of the chamber associated with the tether is increased in the longitudinal direction when the tether is released, wherein, when the tether extends in a width direction, the amount of inflation of the chamber associated with the tether is increased in the width direction when the tether is released, and wherein, when the tether extends in a thickness direction, the amount of inflation of the chamber associated with the tether is increased in the thickness direction when the tether is released.

12. The method according to claim 10, wherein the chambers include a front chamber and an upper chamber, and wherein, when the occupant has a body type smaller than an average body type, the front chamber and the upper chamber are inflated such that lengths of the front chamber and the upper chamber in a leftward-rightward direction are increased.

13. The method according to claim 10, wherein the chambers include a side chamber and an upper chamber, and wherein, when the occupant has a body type larger than an average body type, the side chamber and the upper chamber are inflated such that lengths of the side chamber and the upper chamber in a forward-backward direction are increased.

14. The method according to claim 10, further comprising:

detecting, by a collision detection sensor, a collision direction when a collision accident occurs, wherein the amount of inflation of each of the chambers covering the front portion, the side portion, and the upper portion of each of the shoulders of the occupant is variably controlled based on the collision direction.

15. The method according to claim 14, wherein the chambers include a front chamber, and wherein, when a front collision occurs, the front chamber is inflated such that a thickness of the front chamber in a forward-backward direction is increased.

16. The method according to claim 14, wherein the chambers include a side chamber, and wherein, when a lateral collision occurs, the side chamber is inflated such that a thickness of the side chamber in a leftward-rightward direction is increased.

17. The method according to claim 14, wherein the chambers include an upper chamber, and wherein, when a rear collision occurs in a recline mode in which a seatback is reclined, the upper chamber is inflated such that a thickness of the upper chamber in an upward-downward direction is increased.

* * * * *